US008935751B1

(12) United States Patent
Cardente et al.

(10) Patent No.: US 8,935,751 B1
(45) Date of Patent: Jan. 13, 2015

(54) METHOD FOR EXTENDING THE FRAGMENT MAPPING PROTOCOL TO PREVENT MALICIOUS ACCESS TO VIRTUALIZED STORAGE

(75) Inventors: John Cardente, Milford, MA (US); Stephen Fridella, Belmont, MA (US); Uday Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1135 days.

(21) Appl. No.: 11/537,073

(22) Filed: Sep. 29, 2006

(51) Int. Cl.
*H04L 29/06* (2006.01)
*G06F 21/62* (2013.01)
*G06F 17/30* (2006.01)

(52) U.S. Cl.
CPC ...... *G06F 21/6218* (2013.01); *G06F 17/30067* (2013.01)
USPC ........ 726/4; 726/5; 726/28; 726/29; 713/155; 713/165; 709/229

(58) Field of Classification Search
USPC .......................................................... 726/5, 4
See application file for complete search history.

(56) References Cited

U.S. PATENT DOCUMENTS

| 6,907,414 | B1 * | 6/2005 | Parnell ............................. 706/47 |
| 7,185,047 | B1 * | 2/2007 | Bate et al. ...................... 709/202 |
| 2002/0078239 | A1 * | 6/2002 | Howard et al. ................ 709/245 |
| 2002/0178271 | A1 * | 11/2002 | Graham et al. ................ 709/229 |
| 2003/0212752 | A1 * | 11/2003 | Thunquest et al. ........... 709/213 |
| 2004/0064729 | A1 * | 4/2004 | Yellepeddy .................... 713/201 |
| 2007/0022285 | A1 * | 1/2007 | Groth et al. ................... 713/155 |

OTHER PUBLICATIONS

Mesnier et al., "Object-Based Storage", Aug. 2003, pp. 84-90.*

* cited by examiner

*Primary Examiner* — Taghi Arani
*Assistant Examiner* — Thaddeus Plecha
(74) *Attorney, Agent, or Firm* — Anderson Gorecki & Rouille LLP (57) ABSTRACT

Extensions to the Fragment Mapping Protocol are introduced which protect a disk array from malicious client access by exporting file system access information to the storage device. FMP requests received at the storage device can be authorized at a block granularity prior to completion, thereby limiting the exposure of the disk array to malicious clients. Client authorizations can be cached at the storage device to enable the permissions to be quickly extracted for subsequent client accesses to pre-authorized volumes.

17 Claims, 8 Drawing Sheets

METHOD FOR EXTENDING THE FRAGMENT MAPPING PROTOCOL TO PREVENT MALICIOUS ACCESS TO VIRTUALIZED STORAGE

FIELD OF THE INVENTION

This invention is related generally to the file systems and more particularly to a method of enhancing the security of a Fragment Mapping Protocol to prevent unauthorized access to storage by compromised clients.

BACKGROUND OF THE INVENTION

Storage solutions generally include disk storage arrays which are defined and managed by one or more file systems. A file system includes software programs and data structures which define the use of underlying data storage devices. File systems are responsible for organizing disk sectors into files and directories and keeping track of which sectors belong to which file and which are not being used.

A file server is a computer responsible for the central storage and management of data files so that other computers on the same network can access the files. A file server allows users to share information over a network without having to physically transfer files by floppy diskette or some other external storage device. Any computer can be configured to be a host and act as a file server. In its simplest form, a file server may be an ordinary PC that handles requests for files and sends them over the network. In a more sophisticated network, a file server might be a dedicated network-attached storage (NAS) device that also serves as a remote hard disk drive for other computers, allowing anyone on the network to store files on it as if to their own hard drive.

Clients request access to the file system using a file system protocol. One file system protocol is the Network File System (NFS). NFS is a client/server application of Sun Microsystems, Inc. that lets a computer user view and optionally store and update files on a remote computer as though they were on the user's own computer. Other file system protocols in addition to NFS include the Common Internet File System (CIFS), which is a public variation of the Server Message Block Protocol (SMBP) developed and used by Microsoft. The SMB Protocol is widely used in today's local area networks for server file access and printing. CIFS is viewed as a complement to the existing Internet application protocols such as the File Transfer Protocol (FTP) and the Hypertext Transfer Protocol (HTTP).

The file system software translates client requests into disk operations which are forwarded to the storage arrays using a disk protocol such as the Small Computer System Interconnect (SCSI), Internet SCSI (iSCSI), or the Fibre Channel protocol. SCSI and Fibre channel are standard electronic interfaces that allow computers to communicate with peripheral hardware such as disk drives at high speed.

The disk interfaces are high speed interfaces that are capable of providing large amounts of data to satisfy client requests at any given period in time. However, the potential of the disk arrays to deliver the data is limited by the ability of the file server to handle client access requests. Thus the file server becomes a bottleneck that limits the performance of the storage system to the request handling capacity of the file server.

One mechanism that has been introduced to overcome the problems associated with a file server bottleneck is a Fragment Mapping Protocol (FMP). The Fragment Mapping Protocol is an Remote Procedure Call (RPC) protocol which allows local clients to directly read and write file data to and from networked storage devices, rather than sending I/O requests through the file server. The FMP works in tandem with the file system protocol to expose the file system to applications on the client. Allowing the client to have direct access to the storage devices reduces the delays associated with retrieving data, and improves the performance of client applications.

The FMP generally works as follows. An FMP client communicates file descriptors to an FMP file server to obtain file mapping meta-data that describes how and where the files are stored in the disk arrays. Clients dynamically request meta-data from the server during normal operation in a manner transparent to the client's operating system and applications. Access controls and coherency checks may be applied at a volume granularity. Once the client retrieves the meta-data, it can use file handle information provided in the meta-data to directly access the storage devices via a SCSI or Fibre channel interface, or via an Internet SCSI (iSCSI) interface.

FMP allows the performance capabilities of disk arrays to be more thoroughly utilized by off-loading data transfer tasks from the file server. Although control operations (such as obtaining the meta-data) may be subject to the performance issues of the file server, data transfer, which encompasses the larger portion of an exchange, can be provided directly via the disk interface, thereby more fully realizing the performance potentials of the disk arrays.

One disadvantage of FMP is that it requires FMP clients to have full access to storage volumes used to store data on their file systems, even if the file systems utilize only a portion of the volume. As a result, an FMP client that is compromised by a malicious user or system software could read or modify data that it is not authorized to access. As a result, the use of FMP is generally limited to network configurations where clients are co-located with the storage arrays and can be trusted.

One method of preventing this vulnerability is to use additional host based software such as custom drivers in the file server that would consult with the FMP client to validate file storage accesses. However, even with such a solution it remains possible that such techniques may be bypassed by a malicious client. It would be desirable to identify another type of authentication mechanism to secure FMP operations.

SUMMARY OF THE INVENTION

According to one aspect of the invention, the FMP protocol is extended to allow a cooperating storage system to validate FMP client access requests prior to enabling access by the client to a storage device. Access requests are captured at an intelligent storage device prior to forwarding the request to the storage array. The intelligent storage queries the file server to determine client access permissions. The file server responds with information regarding the clients' permission to access the file. The information may include meta-data associated with the client request. The intelligent storage may store the information for faster validation of later requests by the client.

In essence a portion of file system intelligence is replicated at the point of disk array access. The portion of file system intelligence includes client access control intelligence. The intelligence can be used to prevent unauthorized access of disk array storage by malicious client devices that seek to directly access storage using the Fragment Mapping Protocol. Extending the Fragment Mapping Protocol in this manner increases the number and types of network environments which may experience enhanced performance using the Fragment Mapping Protocol beyond simply a small, trusted network environment.

DETAILED DESCRIPTION

The present invention is directed towards a method and apparatus for extending the functionality of a Fragment Mapping Protocol to enhance the security of Fragment Mapping Protocol access requests.

The Fragment Mapping Protocol (FMP) is a Remote Procedure Call (RPC) protocol which is layered on top of a file system protocol such as the Network File System (NFS) or Common Interconnect File System (CIFS). FMP provides a mechanism for a client device to obtain physical file location information for files in its file system. The location information may include logical unit numbers (LUN) identifying a particular disk device, block information, identifying the block within the LUN where the file is located, and extent information, identifying the size of the file. Location information may also be provided in the form of a Virtual Volume number, using the concepts described in pending application Ser. No. 11/394,768, filed Mar. 31, 2006 and entitled "METHODS, SYSTEMS, AND COMPUTER PROGRAM PRODUCTS FOR PROVIDING ACCESS TO SHARED STORAGE BY COMPUTING GRIDS AND CLUSTERS WITH LARGE NUMBERS OF NODES", incorporated herein by reference. It is appreciated that there are many ways to identify a location of a file, and the present invention is not limited to any particular type of location information.

Once the client has obtained file location information, it may read and write directly to the attached disk storage array via the disk interface using a protocol such as the SCSI protocol. One disadvantage of allowing a client to directly access disk storage in this manner is that the disk storage is vulnerable to malicious acts by clients. The SCSI protocol implements a coarse access control mechanism that controls the ability of a client to gain access to a LUN. A look-up table, indexed by the client ID and interface may be used to selectively block accesses to a LUN by a client device. However, because file systems are generally spread across LUNs, such coarse access control mechanisms tend to require that clients are given access to most LUNs, even when only a portion of the LUN is being used. Because clients are given more access to storage than is necessary the storage is not adequately protected, and is vulnerable to malicious clients.

The present invention overcomes the problems associated with the prior art FMP by providing file system access information at a disk array access point. The disk array access point may be, for example, a target device or switch which couples the client devices to the disk array. The target device may be a processing module that is included in the disk array, and is a 'target' under the SCSI standard. However, it will be appreciated that the present invention is not limited to such a device, but may be any device which controls the flow of requests to and from a disk array. A storage system that includes a target device having the capabilities described herein shall be referred to hereinafter as intelligent storage.

In one embodiment of the invention, the intelligent storage is adapted to communicate with an FMP enabled file server (referred to hereinafter as an FMP server) using an augmented FMP protocol of the present invention. The augmented FMP protocol includes requests and commands which are used to determine a client's access rights with regard to particular group of one or more blocks of data in a volume. Intelligent storage uses these commands to limit disk array accesses to only authorized accesses. In a preferred embodiment, intelligent storage includes a memory for caching client access information to improve the performance of subsequent accesses which have already been authorized. In such an embodiment, the FMP protocol may be further augmented to include a command for causing the cached client access information to be updated or deleted. These and other aspects of the invention will now be described in more detail.

Figure 1:
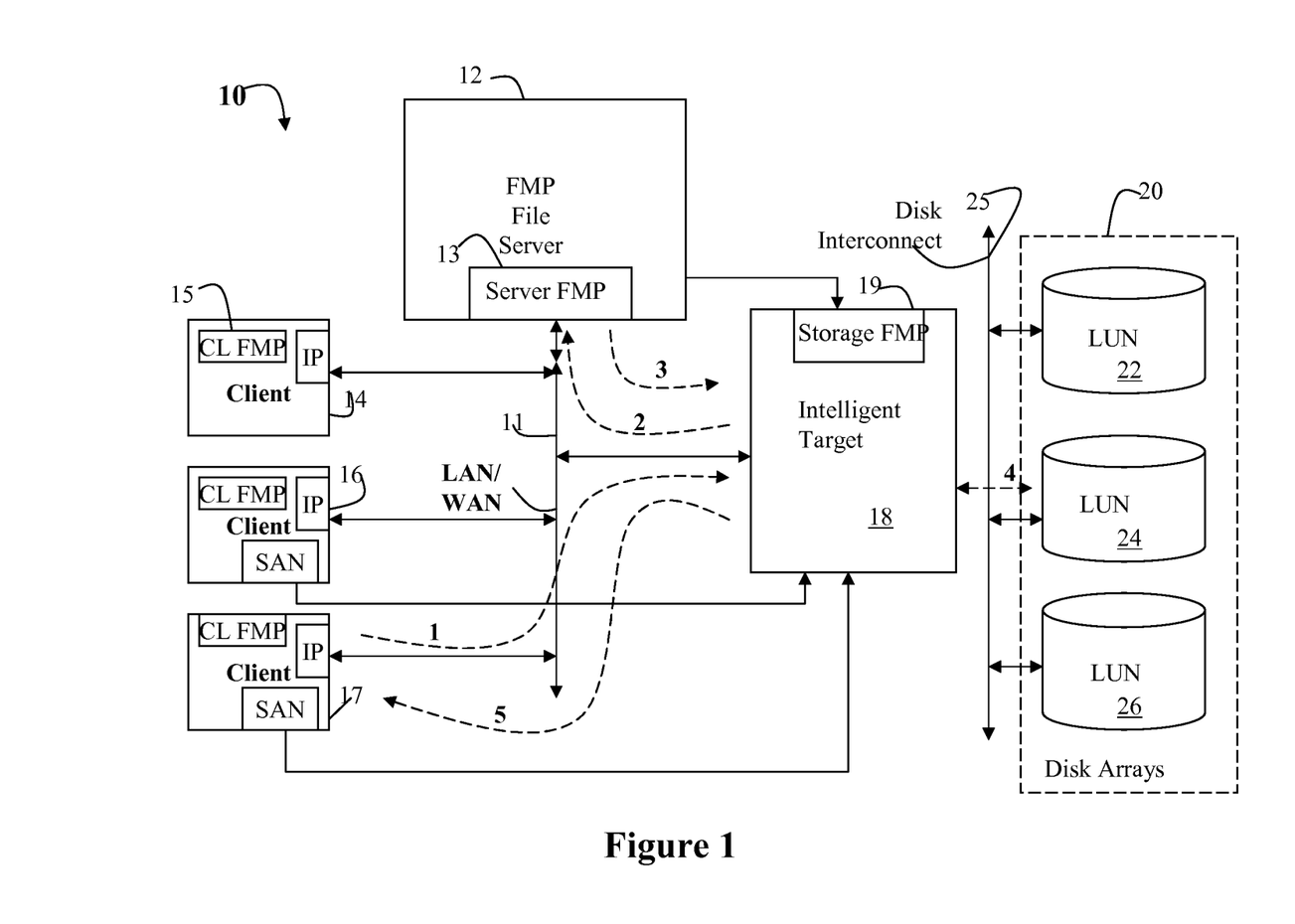
FIG. 1 is a block diagram illustrating exemplary components of a storage system of the present invention.

FIG. 1 illustrates a Network Attached Storage (NAS) system 10 which includes components supporting the present invention. A plurality of client devices 14, 16 and 18 are coupled to a disk array 20 via a file server 12. A client is an entity that accesses the file server resources. The client devices communicate with the file server 12 using the IP protocol over a Local Area Network (LAN) or Wide Area Network (WAN). The client devices each include software and hardware components that enable the client to execute standard FMP to retrieve file location information from the sever 12.

Figure 2:
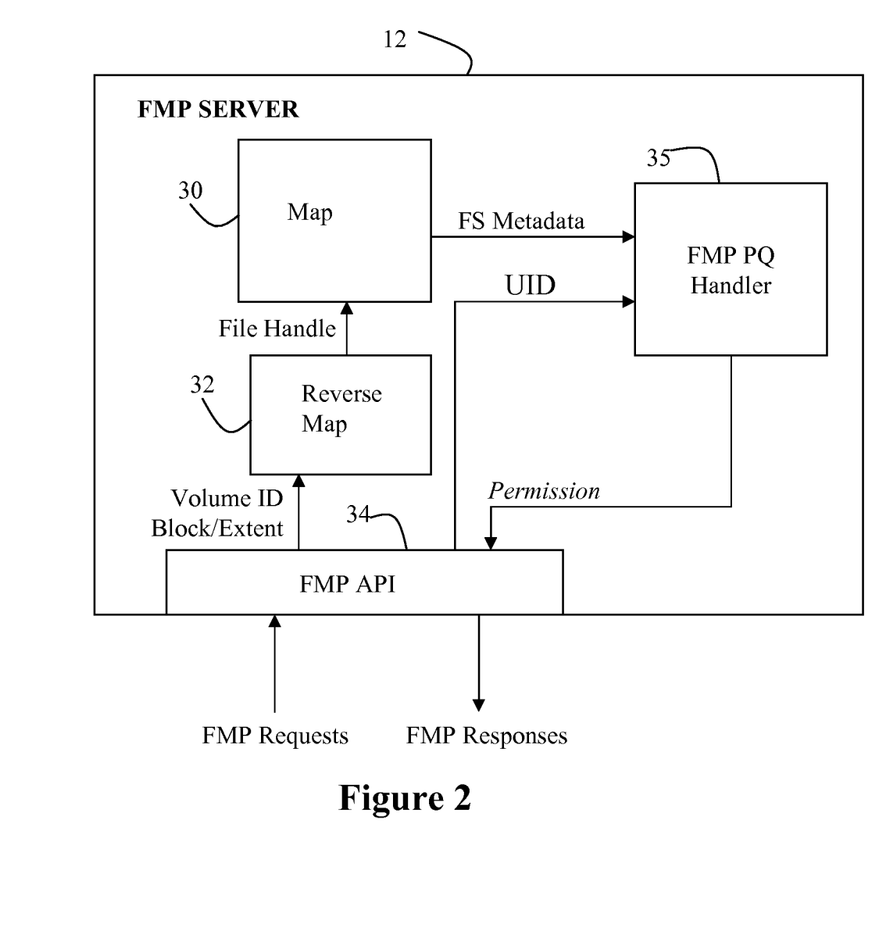
FIG. 2 is a block diagram that illustrates exemplary components that may be included in a Fragment Mapping Protocol server device that incorporates components of the present invention.

File server 12 has access to an attached file system and includes components that support the modified FMP of the present invention and will therefore be referred to herein as an FMP server 12. FIG. 2 illustrates several exemplary components that may be included in an FMP server 12 of the present invention. The components may be implemented in hardware, software or a combination thereof. The functions described below as performed by the components may be combined or differently delineated in other embodiments of the invention, and the present invention is therefore not limited by the particular components illustrated in FIG. 2.

A map 30 stores file system meta-data for each file. The meta-data may include any variety of attributes associated with the file, including but not limited to the length of the file in bytes, the LUN ID (the device containing the file), a list of blocks occupied by the file data, the User ID (UID) of the file's owner, the group ID of the file, an inode number that identifies the file within the filesystem, the file mode, which determines what users can read, write, and execute the file, timestamps telling when the inode itself was last changed (ctime), the file content last modified (mtime), and last accessed (atime). The meta-data that is stored for each file varies according to the file system protocol that is used. For example, a typical meta-data attribute of a CIFS file system is an Access Control List (ACL) which identifies access permissions for the file.

The map 30 is used in the standard FMP protocol to return location information to a client to enable the client to directly access a file in a disk array. The client forwards an FMP GetMap request to the FMP server, where the request includes a file descriptor or handle. The File handle used to index the map 30, which provides the location data to the client in an FMP GetMap Response.

The present invention modifies the traditional operation of FMP in the following manner; in contrast to the FMP GetMap request, by which a file handle was translated into a disk location, an FMP Permission Query (PQ) request of the present invention must first translate a disk location into a file handle. In an embodiment such as that shown in FIG. 2, a reverse map 32 is maintained at the FMP server 12. The reverse map translates a disk location, in the form of a volume ID and block ID/extent for example, into a file descriptor. The file descriptor can then be used as in the prior art to index the map 30 to obtain file meta-data. If the volume ID and block extent do not map to any particular file, it can be assumed that the client does not have permission to access the block.

As mentioned above, in addition to file location information, the file meta-data also includes file access right information. In the present invention, a FMP Permission Query (PQ) handler 35 analyzes the meta-data provided by map 30 together with user ID information to determine if the access request is authorized. The FMP PQ handler may forward an indication of the permission (pass/fail) to the FMP API for return to the intelligent storage. The client's current permissions for the file can also be forwarded in a response. Providing both the all the client's current permissions in the response enables intelligent storage to locally authorize I/O requests from the same client to the same storage volume extent regardless of the original request type. Without this information, a read followed by a write I/O request sequence would require the storage array to re-query the FMP server upon receiving the write request as the prior read request would have only established the read access rights for the client. It should be noted that although it is described that a permission indication and permissions are returned, it is recognized that there are a variety of different file system protocols, and each of the protocols may manifest this information in different forms.

Figure 3:
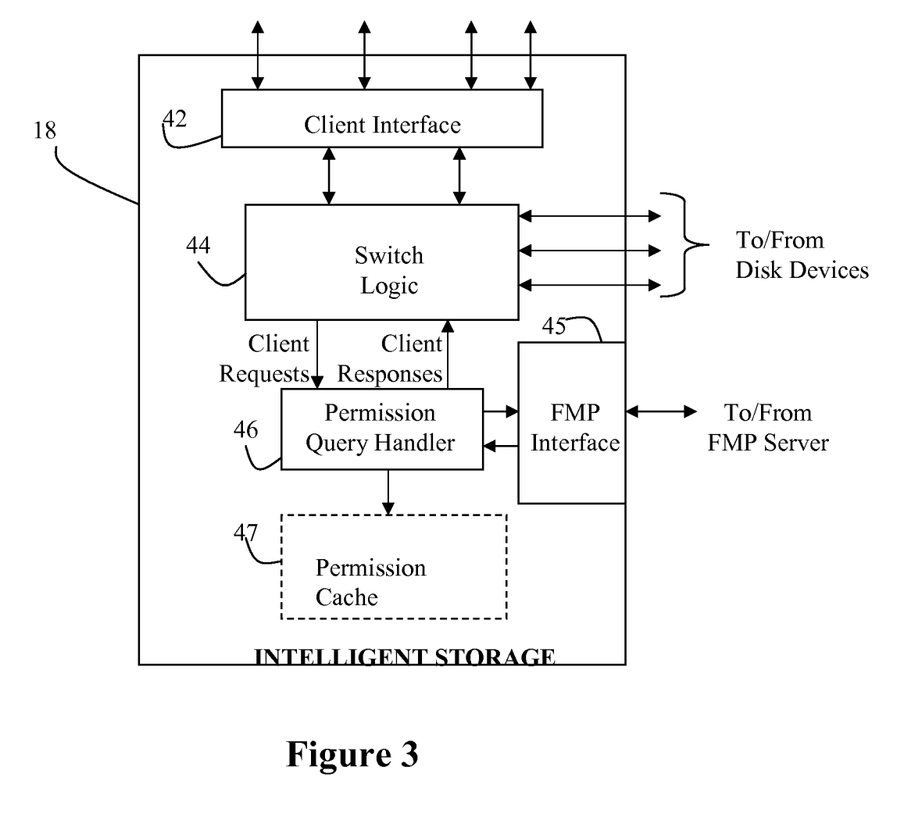
FIG. 3 is a block diagram that illustrates exemplary components that may be included in an intelligent storage device incorporating components of the present invention.

FIG. 3 illustrates several components that may be included in intelligent storage of the present invention. A client interface 42 may be adapted to support one or more of SCSI, FibreChannel or iSCSI protocols to enable a client or file server to communicate with the disk array 20. Client requests are selectively forwarded to the disk array via switch logic 44. According to one aspect of the invention, client requests are first bypassed to a Permission Query (PQ) Handler 46. As will be described in more detail below, the PQ Handler 46 determines whether the requesting client has permission to perform the operation specified in the client's request. The PQ Handler may determine this by querying the FMP server 12, and receiving a permission indication as described in FIG. 2. The query should at least identify the FMP client performing the request, the volume and extent being accessed and the type of request being attempted.

In a preferred embodiment, intelligent storage may also include a Permission Cache 47. The permission cache 47 stores client access information that is provided by the FMP server to intelligent storage. In the event that a client requests access to a file and the client access information is already in the cache (from a previous access), intelligent storage can quickly determine whether the access should be permitted using the cached permission information. It should be noted that it is not a requirement of the invention that the client access be cached, and for this reason the cache is shown in dashed lines in FIG. 3.

Referring back again to FIG. 1, numbered dashed lines are provided to describe a typical flow using the modified FMP protocol of the present invention. At step 1 the client initiates a disk access operation to the disk arrays 20 (using location information obtained from a previous FMP GetMap or AllocSpace request). At step 2 intelligent storage forwards an FMP Query to the FMP server to determine whether the client is authorized to perform the disk access. At step 3 the FMP server returns the authorization indication (or meta-data) to the intelligent storage. At step 4, if the client is authorized, the disk access is performed. At step 5, the result (either the requested data or an error condition) is forwarded to the client.

It can be appreciated that there are many ways by which file system access information may be forwarded to and used by intelligent storage. FIGS. 4-8 are flow diagrams which illustrate exemplary processes and data structures that may be used in an exemplary embodiment, but the present invention is not limited to these processes and structures, and equivalents thereto may be substituted herein without affecting the scope of this invention.

Figure 4:
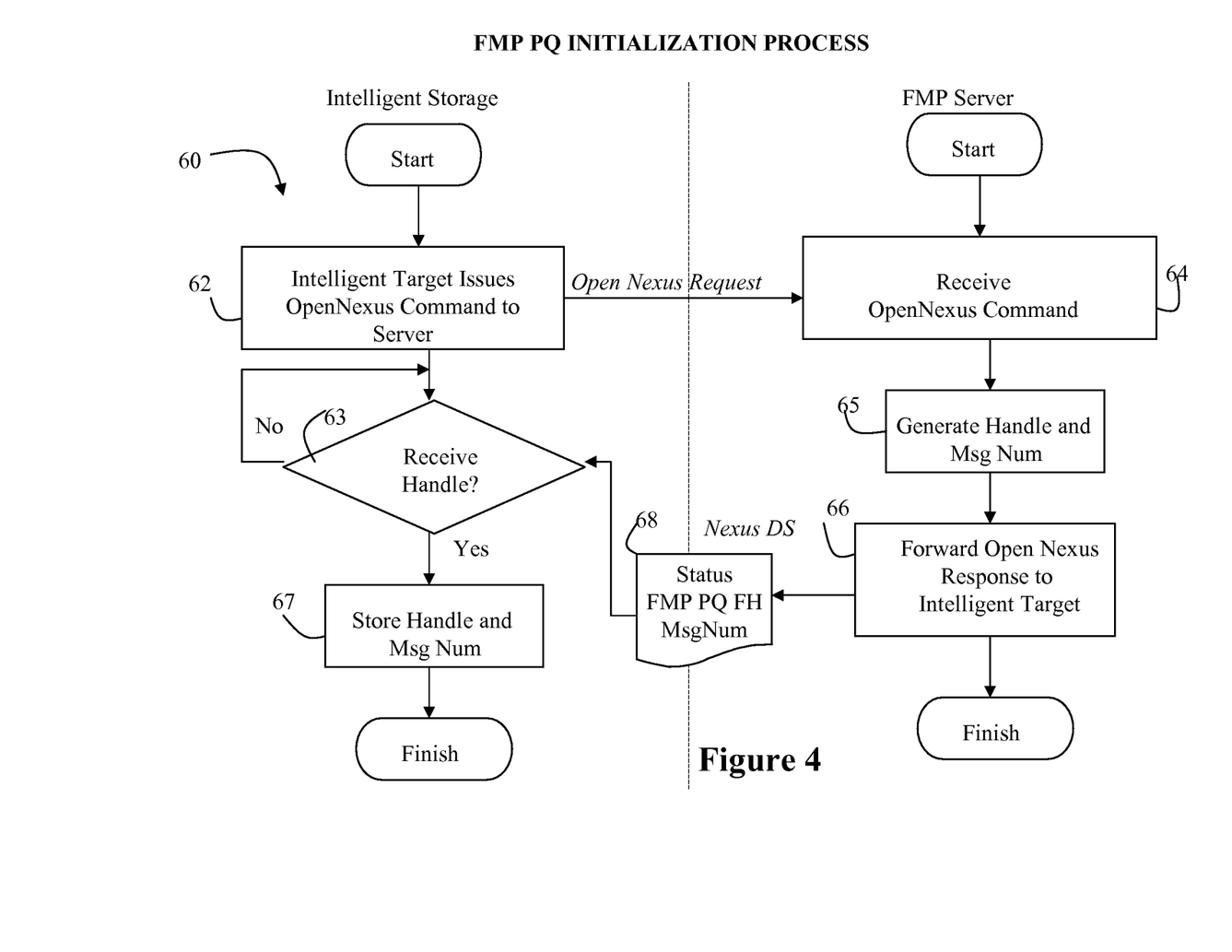
FIG. 4 is a process and data flow diagram that illustrates typical steps and resultant data structures that may be performed and generated to initialize an intelligent storage device of the present invention with an FMP server of the present invention.

FIG. 4 is a flow diagram illustrating exemplary steps that may be performed in a cooperative process 60 between intelligent storage and FMP server to connect the storage system to the FMP server of the present invention. The storage system establishes a connection with FMP servers in a manner similar to FMP clients using an existing FMP_SessionCreate RPC command. The conventional FMP protocol uses "message numbers" initialized and incremented by the FMP server to maintain a relative ordering of all client and server communications. This ordering is required to properly affect global state changes when network messages are dropped or re-ordered during transmission. In the standard FMP protocol, message numbers are maintained for each file opened by an FMP client.

Unlike standard FMP clients, intelligent storage of the present does not open individual files. As a result a new FMP command is needed to create a message number sequence with an FMP server. According to one aspect of the invention, a new FMP command that acts as a generic FMP Open command for storage systems that, instead of opening a file, simply creates a nexus between the storage system and FMP server. For the purposes of this application, the command is referred to as a OpenNexus Request.

As shown in FIG. 4, at step 62 intelligent storage forwards the new OpenNexus command to the FMP Server. At step 64, upon receiving the request the FMP server generates a fake file handle to serve as nexus for all communications with storage system. At step 66 the server forwards an OpenNexus response (populated as shown by data Nexus Data Structure (DS) 68) to intelligent storage. The fields of data structure 68 include a status of the OpenNexus operation, a FMP Permission Query File Handler (FMP PQ FH), and a message number (MsgNum).

Upon receiving the response at step 63, the intelligent storage stores the FMP PQ FH and MsgNum for later use.

Figure 5:
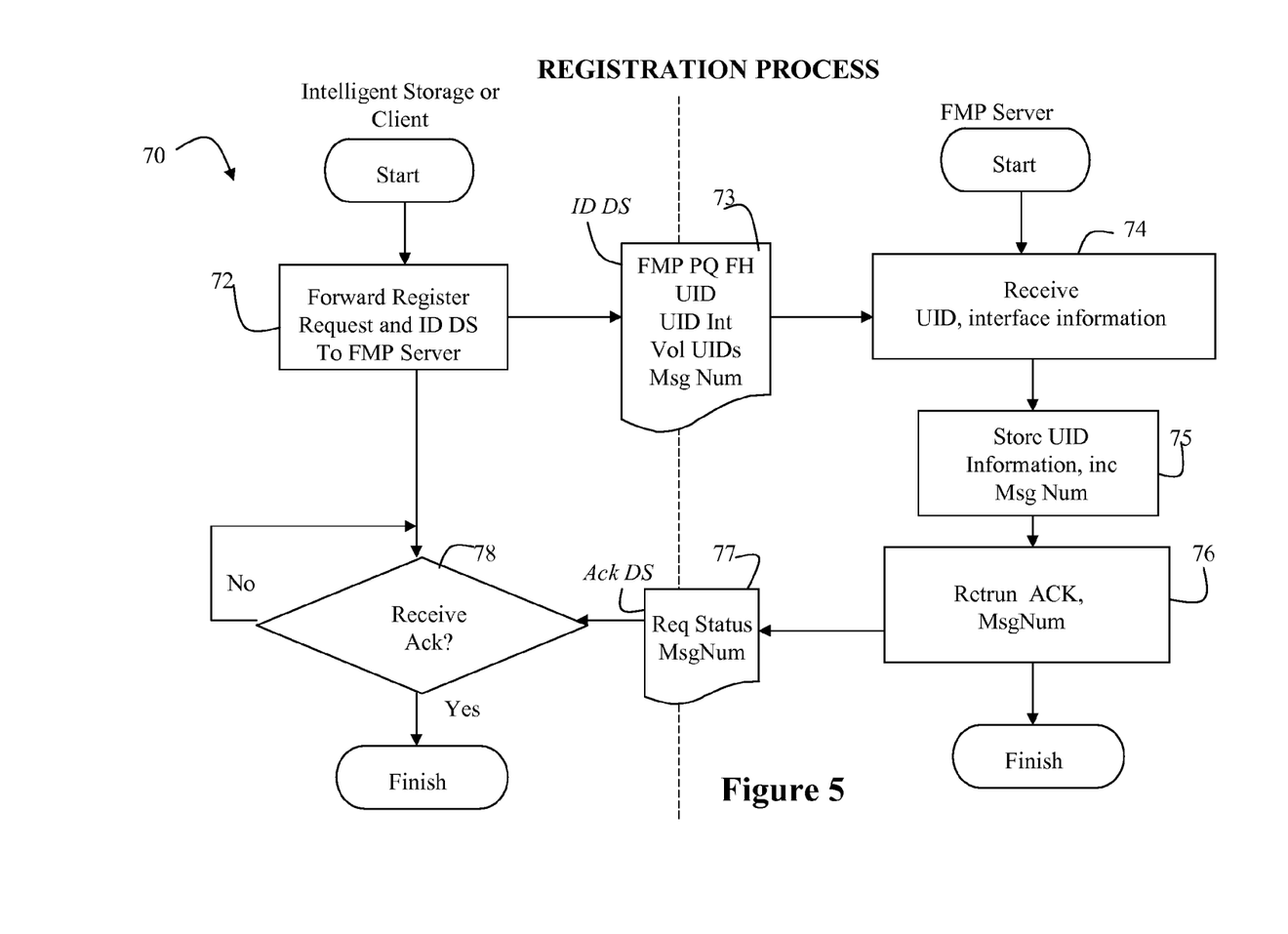
FIG. 5 is a process and data flow diagram that that illustrates typical steps and resultant data structures that may be performed and generated during a process of registering clients and/or intelligent storage with an FMP server of the present invention.

FIG. 5 is a flow diagram that illustrates steps performed and data structures populated in a cooperative process between client devices and intelligent storage to register with the FMP server. Registration allows FMP clients and storage systems to provide the unique identifiers that are used to verify access rights using the FMP protocol extensions of the present invention.

At step 72 the entity seeking registration (client and/or storage system) forwards a Register Request 73. The Register Request is populated with the following fields: the FMP PQ FH, User ID (UID), a User Interface List (UID Int) of UIDs for each interface into storage network, a Volume UID (a list of volume UID structures for volumes accessible by this FMP client or exported by this storage system) and the MsgNum (The server message number as returned by the last message from the server).

At step 74 the FMP server receives the client/storage system registration information, and at step 75 stores the information in a local database. At step 76 the FMP server forwards an Acknowledgement DS (Ack DS 77) to the registering entity. The Ack DS 77 is shown to include a Request Status (success/fail) and MsgNum (Set to one more than the one in the last message or 1 if the server supplied a new file handle). At step 78 when the registering entity receives the acknowledgement the registration process is complete, and the registering entity is free to execute FMP operations.

Figure 6:
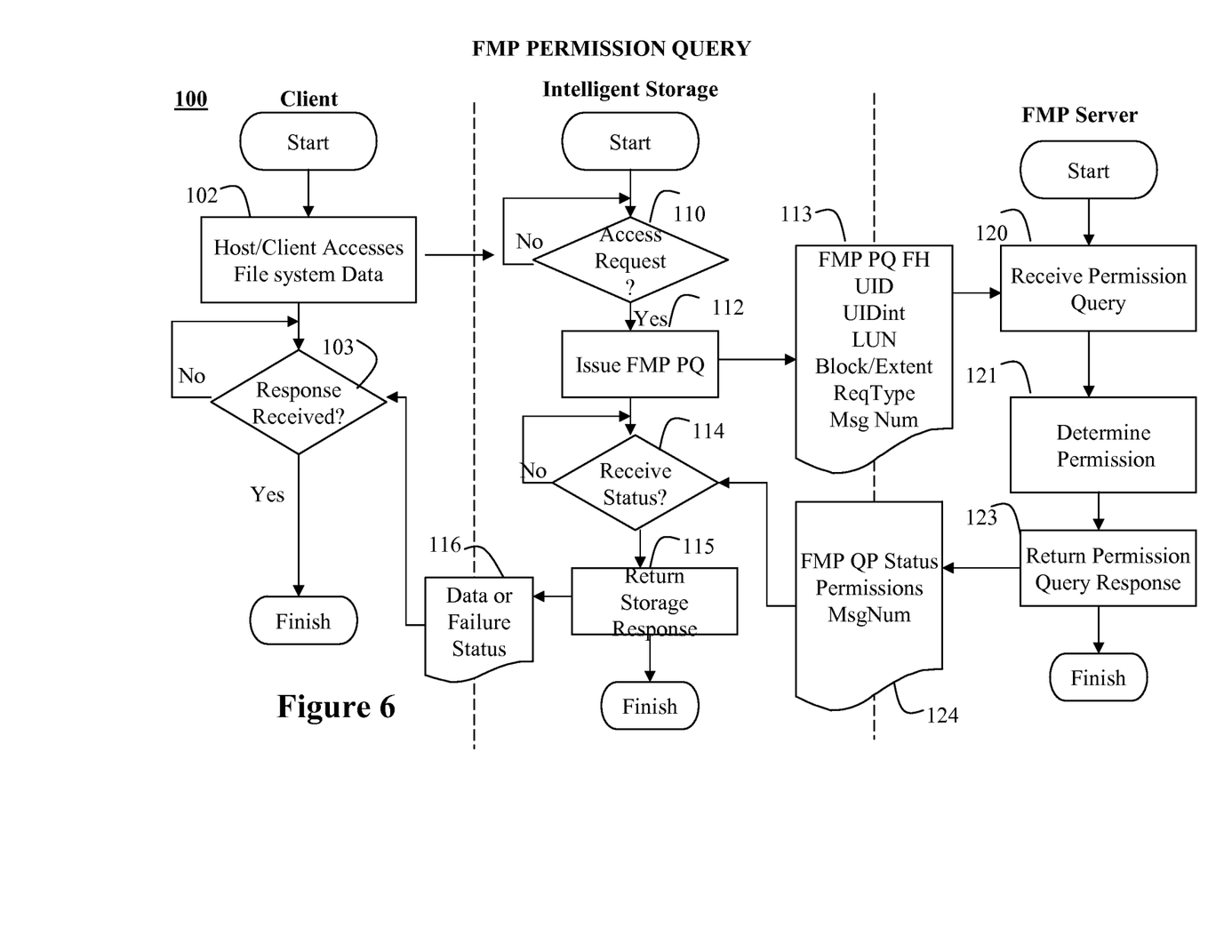
FIG. 6 is a process and data flow diagram that that illustrates typical steps and resultant data structures that may be performed and generated during an FMP read or write by a client device.

FIG. 6 illustrates exemplary steps that may be taken by each of an FMP client, intelligent storage and FMP server of the present invention to a mechanism to allow storage systems to query an FMP server to determine an FMP client's right to access a particular storage volume extent.

At step 102 the client/host issues a file system access to intelligent storage. When intelligent storage receives the request at step 110, it issues an FMP Permission Query (FMP PQ) to the FMP server. The FMP PQ may be populated as shown by the data structure 113. The FMP PQ 113 includes the FMP PQ FH, UID, UIDInt, LUN being accessed, Block/Extent information, Request Type (read/write) and MsgNum.

When the FMP server receives the FMP PQ at step 120, it uses provided information, previously provided UID information, the newly added reverse map database, and its mapping metadata to determine the client's access permissions and ability to perform the specified I/O request to the specified storage volume and extent. At step 123 the FMP server returns the FMP PQ response, which may be populated as shown by data structure 124. As described above, the FMP PQ response 124 may include FMP PQ Status (pass/fail) and a complete list of permissions for the client/volume/extent combination.

After intelligent storage receives the response at step 114, it evaluates the status, and returns a response to the client at step 115. If permission was granted and the access was a read, the response may include the read data. If permission was granted for a write, the response may include an acknowledgement of the write. If permission was not granted, the response indicates failure status to the client. At step 103, when the response is received the client access is completed.

Figure 7:
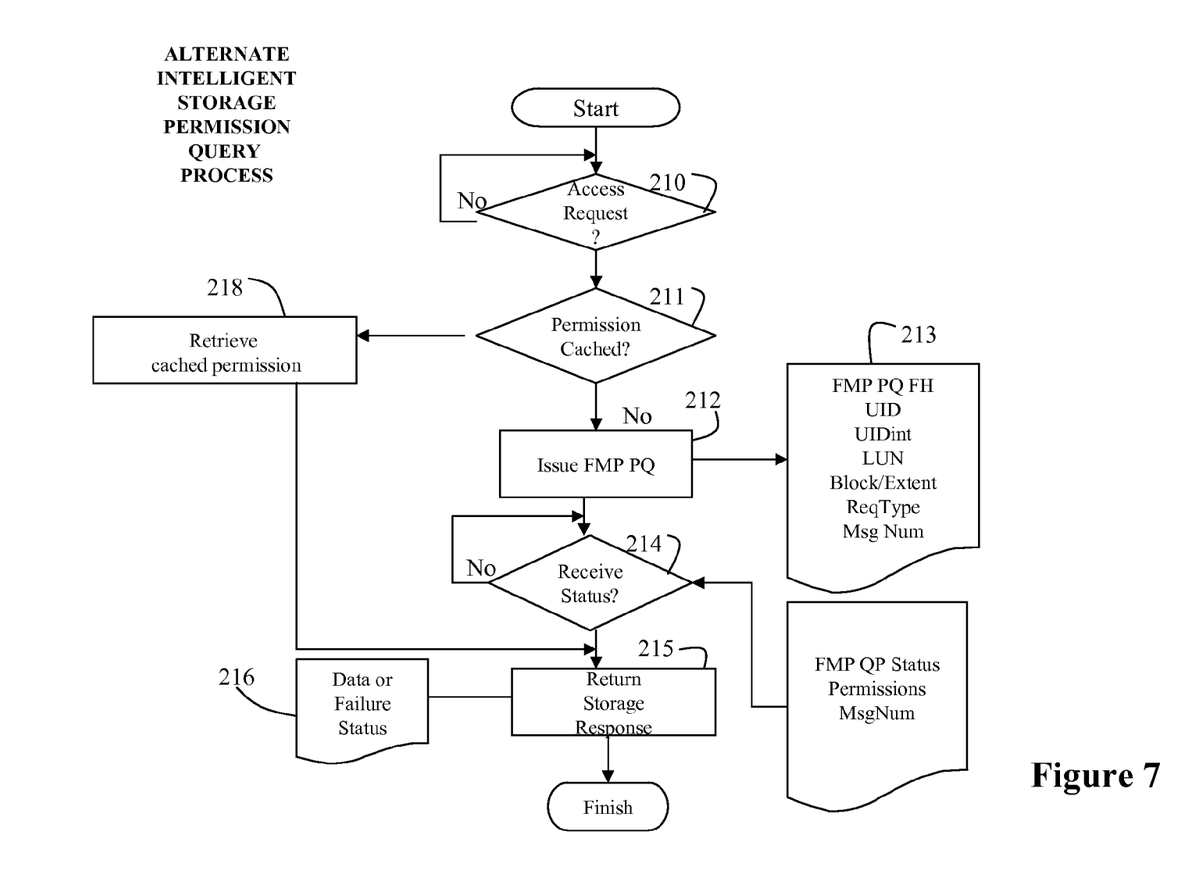
FIG. 7 is a process and data flow diagram that that illustrates a second embodiment of typical steps and resultant data structures that may be performed and generated by an intelligent storage device in response to a client FMP access request, when the intelligent storage device includes a cache providing temporary storage of client meta-data.

As mentioned above with regard to FIG. 3 intelligent storage includes, in a preferred embodiment, a cache for storing retrieved client permission information or other retrieved client meta-data. FIG. 7 is a flow diagram of exemplary steps that may be performed during a permission query process by an intelligent storage device that includes a cache. When an access request is detected at step 210, the process continues next to step 211 where the permission cache 47 is indexed, using volume/extent/UID information to determine if permission has already been retrieved from the FMP server for the client/volume/extent combination. If so, at step 218 the cached permission is retrieved and the process continues directly to step 215, where a response is returned based on the permission results as described above. Thus it can be seen that the permission cache can be used to quickly identify allowed accesses to reduce the overhead involved with retrieving permission data from the FMP server.

Figure 8:
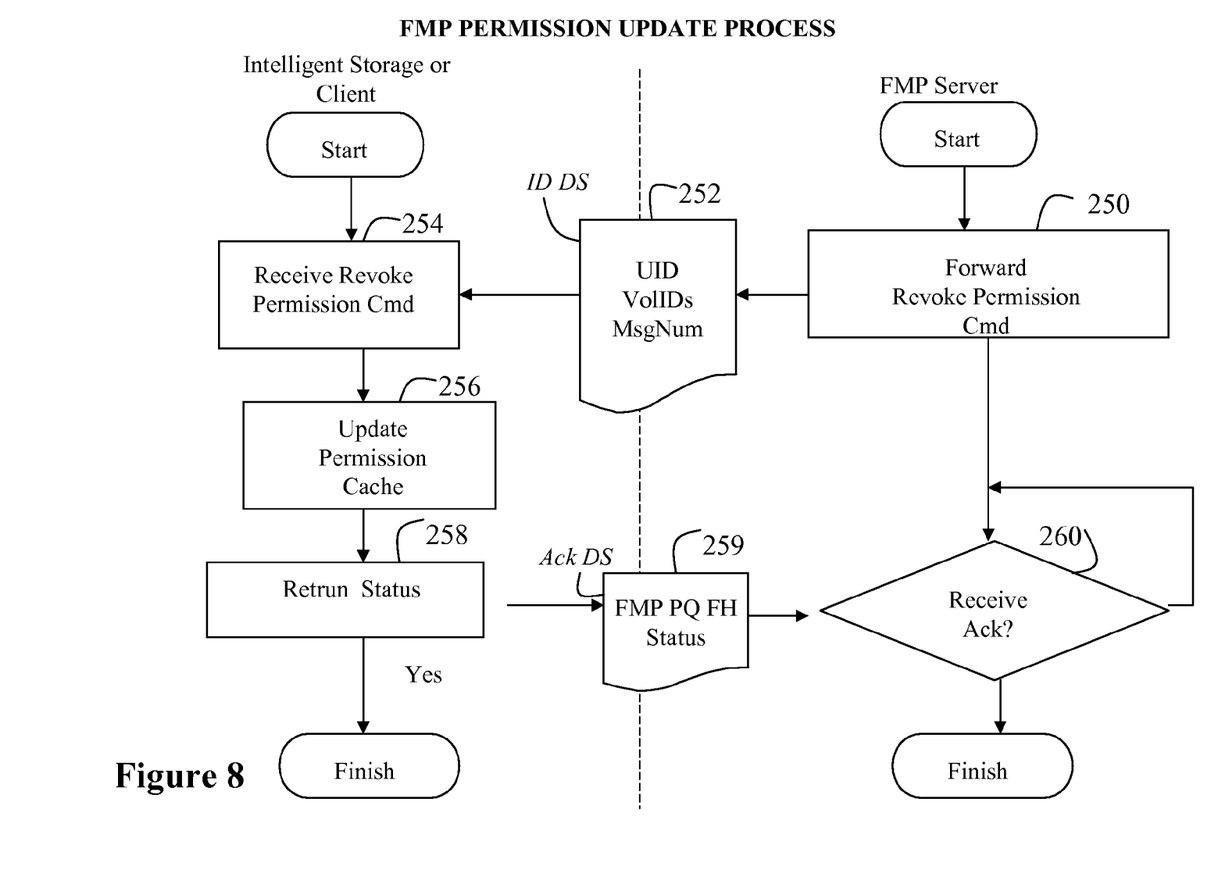
FIG. 8 is a process and data flow diagram that that illustrates typical steps and resultant data structures that may be performed and generated by an intelligent storage device and an FMP server of the present invention during a permission update process of the present invention.

However, client access rights can change over time, and it is desirable to include a mechanism which enables the FMP server to revoke client permissions by pushing updates or otherwise invalidating entries in the permission cache 47. According to one aspect of the invention, the FMP protocol is augmented to include a FMP Revoke Permission (RP) command. FIG. 8 is a flow diagram that illustrates various steps that may be taken by a FMP server and intelligent storage of the present invention to maintain coherency in the permission cache 47.

At step 250 the FMP server 12 forwards the Revoke Permission Command to intelligent storage. The RP command may include the elements shown in structure 252, which identifies the UID of the client for whom permissions are being revoked, a list of volume UID structures for volumes for which permissions are revoked, and the server MsgNum.

When the intelligent storage receives the RP command at step 254 it updates the cache accordingly at step 256. At step 258 it forwards status (completed, invalid) to the FMP server, and the process is completed. In addition to revoking permissions, it is envisioned that the present invention may be adapted to affirmatively push updates to the permission cache which add access rights to a client in addition to the deletion of access rights.

Accordingly extensions to the Fragment Mapping Protocol have been shown and described which protect a disk array from malicious client access by exporting file system access information to the storage device. FMP requests received at the storage device can be authorized at a block granularity prior to completion, thereby limiting the exposure of the disk array to malicious clients. The increased ability of the present invention to limit block accesses to those clients that are authorized will allow the FMP protocol to be used in a larger variety of network configurations and protocols.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A file server for serving a file system, the file server comprising:
an interface configured to receive a query from a storage device to validate a request made by a client device to access a file from the storage device, the query including a user identifier and a file location associated with the file access request; and
a non-transitory computer usable medium having a computer readable program code, said computer readable program code including:
a reverse map configured to translate the file location into a file descriptor, the file descriptor being used to obtain meta-data corresponding to the file; and
a permission query handler, operative to determine, in response to the meta-data and access information associated with the file descriptor, whether the client device associated with the user identifier is authorized to access the file,
the interface configured to send a determination indication to the data storage device in order to prompt the data storage device to allow the client device to access the file only if the client device is authorized to access the file.

2. The file server of claim 1 wherein the query is implemented as a remote procedure call to a fragment mapping protocol.

3. The file server of claim 1 wherein the interface is configured to send one or more client device permissions associated with the file to the storage device.

4. The file server of claim 3, wherein the interface is configured to forward a command to the storage device revoking the one or more permissions associated with the file.

5. The file server of claim 4 wherein the command is implemented as a remote procedure call to a fragment mapping protocol.

6. An apparatus comprising:
a storage interface configured to communicate with a plurality of storage devices;
a client interface configured to communicate with a plurality of clients seeking access to the plurality of storage devices, including to receive a request from a coupled client device to access an extent of data from the storage devices;
a network interface configured to communicate with a file server which services a file system associated with files maintained on the storage devices; and
a non-transitory computer usable medium having a computer readable program code, said computer readable program code including a permission query module, coupled to the client interface and the network interface for generating a query to the file server in response to receipt of the request from the coupled client device, the request including a client identifier and a location of the extent of data, the query including the client identifier and the location of the extent of data associated with the access request, the file server being configured to use the request to retrieve access information for the coupled client for the location of the extent of data and return the access information to the apparatus, the apparatus allowing the coupled client to access the extent of data only if the coupled client is authorized to access the extent of data.

7. The apparatus of claim 6 wherein the query is implemented as a remote procedure call to a fragment mapping protocol.

8. The apparatus of claim 6 further including a cache for storing the access information received from the file server.

9. A method for controlling access to a storage array comprising:
receiving, at a storage device, a request from a client to initiate an access to an extent comprising one or more blocks on the storage device;
generating, at the storage device, a query corresponding to the request, the query including a user identifier corresponding to the client and a storage location associated with the access request;
forwarding, from the storage device to a server a query to a file servicing a file system associated with the request, the query to determine whether the client is authorized for the access;
receiving the query at the server;
determining, at the server, whether the client is authorized to access the one or more blocks by using the storage location, the user identifier and the file system;
responding, from the server to the storage device, to the query with an indication of whether the client is authorized to access the extent; and
selectively permitting, at the storage device, the client to access the extent based on the indication a response from the file server in response to the query.

10. The method of claim 9 wherein the query includes one or more of a Logical Unit Number (LUN) of a disk device to be accessed, a list of user interfaces used to access the LUN and a type of access.

11. The method of claim 9 further including receiving the response from the server, the response including at least one of an access status and a plurality of permissions for different types of accesses by the client to the extent.

12. The method of claim 11 further including storing the response of the server in a cache.

13. The method of claim 12 further including checking the cache for access permissions in response to the client request before generating the query for the server.

14. A method of validating access rights to a storage device comprising:
   receiving, by a server from the storage device, a permission query associated with a request sent from a client to the storage device to access data from the storage device, the permission query identifying the client, a location of the data, and a type of access;
   reverse mapping the location of the data into a file descriptor associated with a file at the location of the data;
   retrieving access information for the file using the file descriptor;
   determining whether the client identified in the query has permission to perform the type of access identified in the query on the file; and
   responding, from the server to the storage device, to the permission query with an indication of whether the client has permission to perform the type of access identified in the query on the file.

15. The method of claim 14, wherein the indication is an indication of a success or failure of the access.

16. The method of claim 14 wherein the indication is an indication of permissions available to the client for the file for different types of accesses.

17. The method of claim 16 including revoking permissions available to the client for at least one of the different types of accesses.

* * * * *